UNITED STATES PATENT OFFICE.

GUSTAVE LOUIS BOURQUIN, OF PERKASIE, PENNSYLVANIA, AND RUDOLF LOEB, OF CAMDEN, NEW JERSEY, ASSIGNORS TO SAID LOEB.

GRINDING AND SHARPENING MACHINE.

1,149,991.  Specification of Letters Patent.  Patented Aug. 10, 1915.

Application filed July 6, 1910. Serial No. 570,585.

*To all whom it may concern:*

Be it known that we, GUSTAVE LOUIS BOURQUIN and RUDOLF LOEB, citizens of the United States, and residents of Perkasie, Bucks county, Pennsylvania, and Camden, Camden county, New Jersey, respectively, have invented certain Improvements in Grinding and Sharpening Machines, of which the following is a specification.

Our invention relates to machines or apparatus designed for trimming and grinding knives; and the object of our invention is to provide a machine for preparing from suitable raw material, a band knife such as is employed in the embroidery cutting or trimming machine forming the subject of our application for patent filed Nov. 18, 1909, Serial No. 528,725. The cutting operation described in said application is in the nature of a shearing action against a suitable support or anvil by means of a metal band knife made of relatively thin stock, of substantially accurate and definite width throughout its length, which knife is reciprocated to effect the cutting operation and fed or advanced during such reciprocation so as to constantly present a sufficiently sharpened edge to perform the work required.

The mechanism forming the subject of our present invention is designed to prepare, ready for use, the band knife employed in our cutting or trimming machine before referred to.

The mechanism forming the subject of our present invention takes care of the stock, which is of rolled sheet metal, and which may be assumed for all practical purposes in connection with our apparatus to be substantially the same gage throughout. Any variation that may exist need not be taken into consideration unless it is more than one one-hundredth of an inch, and as it is possible to secure stock of a thickness whose variations will not exceed two to three one-thousandths of an inch, such stock may be assumed to be of uniform gage throughout. In the preliminary preparation of such stock, however, the width may vary; and in the successful operation of our embroidery trimming machine, it is necessary that the width of the finished blade be absolutely unvarying in order that there may be no opportunity for lateral movement or slippage or for the cutting edge getting out of line, since such condition would occasion an imperfect trimming on the one hand and danger of severance or other damage to the embroidered edge on the other hand. The machine of our present invention, therefore, is provided with means to receive the stock, which may have a width closely approaching the desired width of the finished knife or blade; to trim the same accurately to the desired width, and to simultaneously grind the edge; subsequently rolling said band knife as fast as it is ground upon a suitable reel or drum ready for use. The drum or reel containing the band knife may then be transferred directly to the cutting or trimming machine ready for use.

These and other features of our invention are fully pointed out hereinafter, reference being had to the accompanying drawings, in which:

Fig. 4, is an enlarged view, partly in section, of a portion of the structure shown in Fig. 2.

In the drawings herewith, 1 represents a suitable bed or base plate supporting brackets carrying bearings for the several shafts and spindles of the pulleys, grinding wheels, gear wheels, &c. A main driving shaft 2 is mounted in bearings 3 and 4 carried by suitable supporting brackets 5 and 6. Power to drive the same may be applied to a conepulley 7 carried by said shaft 2, and transmitted through the latter and a bevel gear 8, to shafts 9 and 10, by means of bevel gears 11 and 12, which shafts carry pulleys 13 and 14, respectively. Driving belts 15 pass around pulleys 16 journaled on spindles or shafts 17, which spindles carry grinding or polishing disks at their opposite ends. There are four spindles or shafts 17 driving four grinding or polishing disks, which are indicated at 18, 18ᵃ, 18ᵇ, and 18ᶜ. All of these disks are driven in the same direction and in order to impart and insure positive driving of the same the belts 15 are passed around idlers 19 carried by shafts or spindles 20 suitably supported by the bed plate of the machine. The spindles 17 are supported and rotate in sleeves 23, which in turn are supported by and oscillate in sleeves 24, the spindles being mounted eccentrically with respect to the sleeves 23, as clearly shown in Fig. 7, so that the grinding and polishing wheels may impart a rubbing as well as a grinding action in their engagement with the band knife blade.

The sleeves 24 have at their central part a threaded portion 25, to which is adapted a nut 26, held between bearings 27 of a bracket 28 supporting the sleeves 23 and 24, such bracket being attached to an extension 29 of the supporting bracket 6. Movement of said nuts 26 causes the pairs of sleeves 23 and 24 to move longitudinally in said bearings 27, and said sleeve 24 being held between a shoulder 30 on the sleeve 23 and a pinion 31 at the opposite end of said sleeve, the grinding disks 18, 18ᵃ, et seq., may be thereby adjusted for proper engagement with the work. It will be noticed that the threads of the sleeves are comparatively few in number so there is plenty of room for any desired adjustment of the grinding or polishing disks.

The spindles 17 have near their upper ends threaded portions 32 on which are mounted nuts 33 and 34, and they are tapered the length of their bearing in the sleeves 23. At the opposite end of the spindles 17 a shouldered portion 35 and a threaded portion 36 are provided; a grinding disk holder 37 being mounted on said threaded portion. The nuts 33 and 34 serve to hold the spindles 17 in place and to provide for the necessary adjustment when any wear takes place. The holders 37 are cup-shaped to receive the grinding disks 18, 18ᵃ, et seq., which grinding disks may be of emery, stone or other suitable material, and may be held in place by spring clips 21 supported by set screws 22 passing through the marginal wall of the holders 37. Any other suitable means may be employed to secure these disks in place.

A pinion 38 on the shaft 2 meshes with a gear 39 on a stud 40, said gear 39 having a pinion 41, which meshes with a gear 42 on a stud 43, and a pinion 44 carried by the gear 42 drives a shaft 45 supported in suitable bearings, one carried by a bracket 46 and the other being supported by an extension 29ᵃ of the supporting bracket 5, through the medium of the gear wheel 47. The shaft 45 has at its opposite end an eccentric 48, the strap of which is connected by means of a rod 49 to a rack-frame 50, having racks 51, four in number, meshing with the pinions 31 of the sleeves 23 and the operation of the eccentric 48 gives these racks a reciprocating motion. As the spindles 17 are mounted eccentrically in the sleeve 23, see Figs. 7 and 8, such action will give the grinding disks 18 an oscillatory or rocking movement in addition to their rotative movement. The rack-frame is slidably mounted in brackets 52 secured to the extension 29. It will be understood, of course, that the mountings for all the grinding disks are of the same construction. The grinding disks may be and preferably are graduated from a coarse to a fine surface in their order of contact with the knife; disk 18 being the coarsest and disk 18ᶜ being of a fine grained stone or other suitable material imparting a polish as well as the final grinding touch to the band knives. In order to maintain the driving belts 15 taut, the disks move in unison so that any change in the position of the belt due to the eccentric movement of the spindles 17 is equalized.

A small grinding disk 53 mounted on a shaft or spindle 54 may be provided for the purpose of finishing the sharpening operation upon the band knife by removing the wire edge from the same. This shaft or spindle 54 may be carried by a sleeve 55 having a stem 56 adjustably mounted in a socket 57 carried by the lower shaft or spindle 20. The sleeve is pivotally connected to said stem at 58 and is movable on said pivot so as to adjust the relationship; a set screw at the pivot point holding it firmly fixed when adjustment is completed. To prevent movement toward the knife when adjustment is finally made, a set screw 59 mounted in a bracket 60 carried by the sleeve 55 is provided. The stem 56 is suitably held in the socket 57 by a screw or other means and angular adjustment of the grinding disk 53 may be provided for by turning said stem in its socket. The disk 53 can be adjusted vertically by means of a nut 61 in the same manner as the grinding disks carried by the spindles 17 are adjusted. Movement may be imparted to the disk 53 through the medium of a pulley 62 mounted on the shaft 54, and a belt 63 which may be driven from the lower idler 19. When adjusted the nut 61 may be held by a set screw 61ᵃ.

A spiral pinion 64 is mounted on the shaft 2, meshing with a pinion 65 on a shaft 66 disposed at right angles to the shaft 2, and at the opposite end of the shaft 66 a pinion 67 is carried meshing with a gear 68 journaled on a stud 69 mounted in a bracket 70 carried by the support 5. The gear 68, through universal joints 71, connecting rod 72, a shaft 73 and a worm 74, drives a worm-wheel 75 on a shaft 76. A spiral gear 77 attached to the shaft 76 meshes with a gear 78 on a shaft 79 journaled in bearings 80 of brackets 81. An extension 76$^a$ of the shaft 76 is journaled in bearings 82 of a bracket 83; one end of the same being carried by a threaded sleeve 84 mounted in said bracket 83. The shaft 76$^a$ carries a pinion 85 and a cutting roll 86, and the portion of the shaft within said sleeve is reduced. By removing the sleeve, the extension shaft 76$^a$ can be slipped out for the insertion of a different width cutting roll. The pinion 85 meshes with a pinion 87 carried by a shaft 88 mounted in adjustable bearing boxes 89 and imparts motion thereto. The adjustable bearing boxes are supported by extensions of the bracket 83, and the shaft 88 carries a hardened steel roll 90 which forms, in connection with the side flanges of the roll 86, shearing means for cutting the steel band knives to their proper width. For the purpose of adjusting the shearing rolls in case of wear, caps 91 for covering the bearing boxes 89 are provided with adjusting screws 92.

Figures 5, 6, 11:
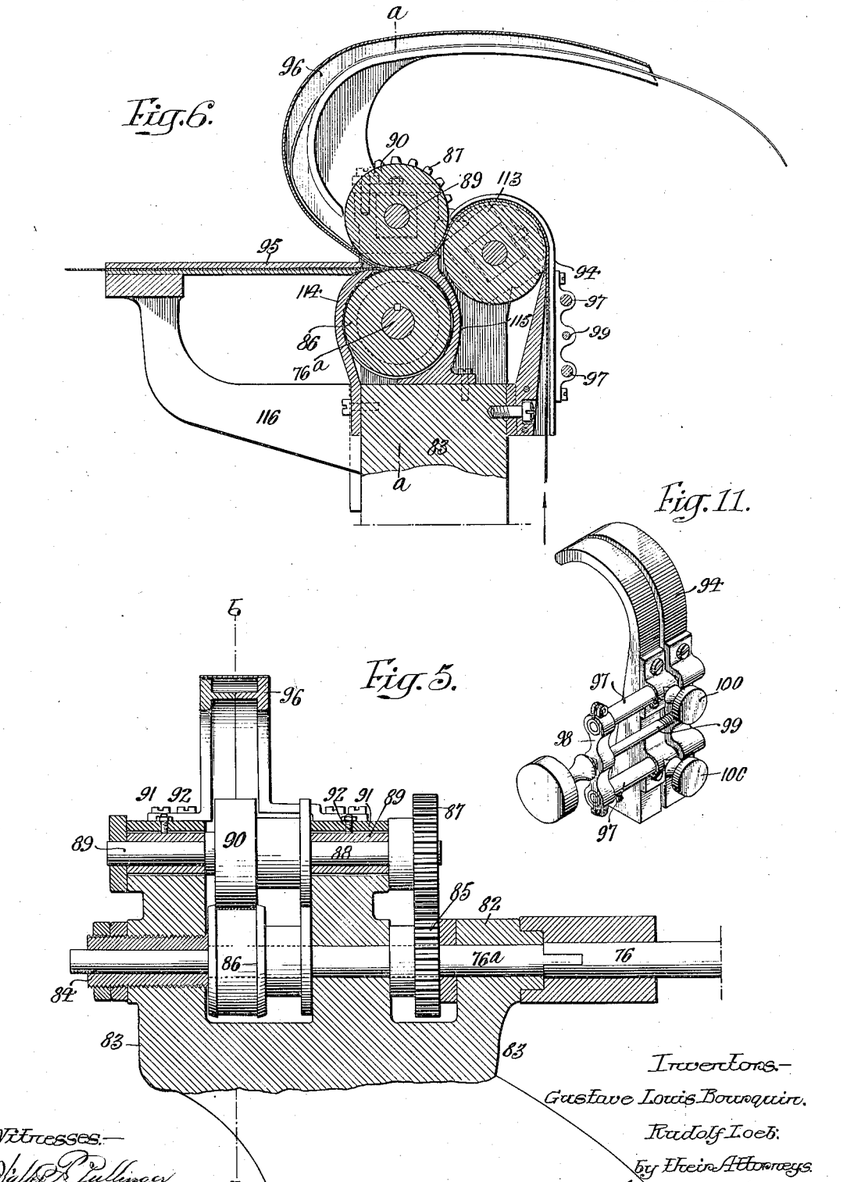
Fig. 5, is an enlarged sectional elevation on the line 5—5, Figs. 2 and 6.
Fig. 6, is a sectional elevation on the line 6—6, Fig. 5.
Fig. 11, is a perspective view of the knife blank guide.

The band knife stock under operation is directed to the shearing means by a guide 94, and from the shearing means a knife blank of the desired width is delivered through a guide 95, while the parts sheared from the edges of the same pass out through an upper guiding hood 96. In many instances, the width of the blank may vary, or it may be desirable to vary the width of the finished knife blade and for this purpose the guides 94, 95 and 96, may be made laterally adjustable. In Fig. 11, I have shown the guide 94 made in a plurality of parts, one of which may be suitably anchored to the frame of the machine, while the other may be mounted on suitable guide rods 97 connected by a cross-bar 98 so as to move in parallelism, having adjusting means which may be in the form of a screw 99, and means, as set screws 100, to engage the guide rods when the desired adjustment has been effected.

Figure 12:
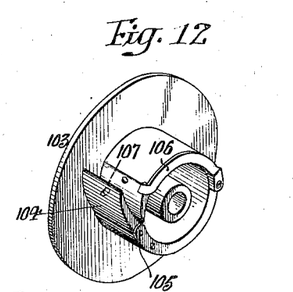
Fig. 12, is a perspective view of the reel upon which the finished knife blade is wound.

The band knife stock from which the knives are cut may be mounted on a spool or reel which may be placed on a shaft 101, and the finished knife may be wound upon a similar spool or reel placed upon a shaft 102; said shafts being disposed at opposite ends of the bed-plate of the machine, as clearly illustrated in the drawings. One of the spools or reels for the band knife stock and finished knife blade, is indicated at 103 in Fig. 12. This spool may be provided with a movable plate 104, hinged at 105, and when such plate is lying against the drum of the spool it may be held down by the hooked end of a spring finger 106. The plate 104 is provided with a pin 107 and the end of the knife stock or the finished blade may be apertured to engage said pin so as to be held to the spool while being wound or unwound; the drum having a recess receiving the projecting end of said pin.

Figure 1:
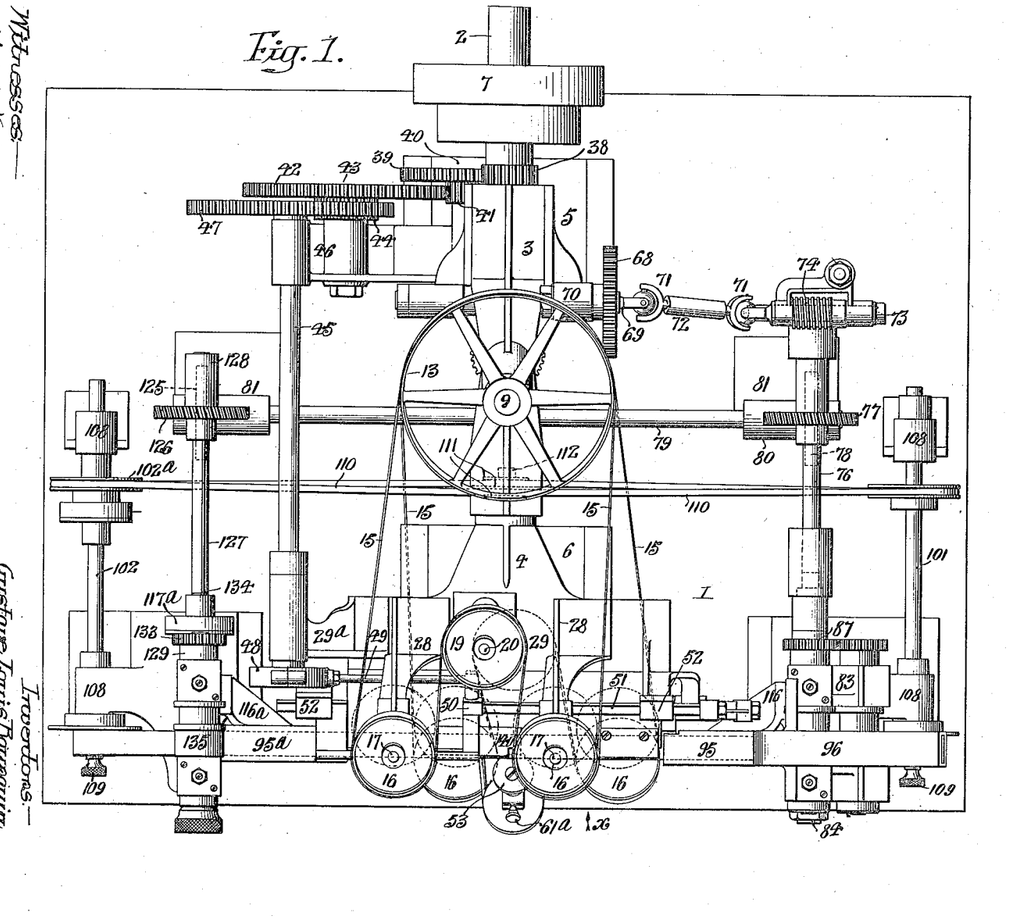
Figure 1, is a plan view of an apparatus embodying our invention for preparing band knife blades.
Figures 1, 7, 8, 9, 10:
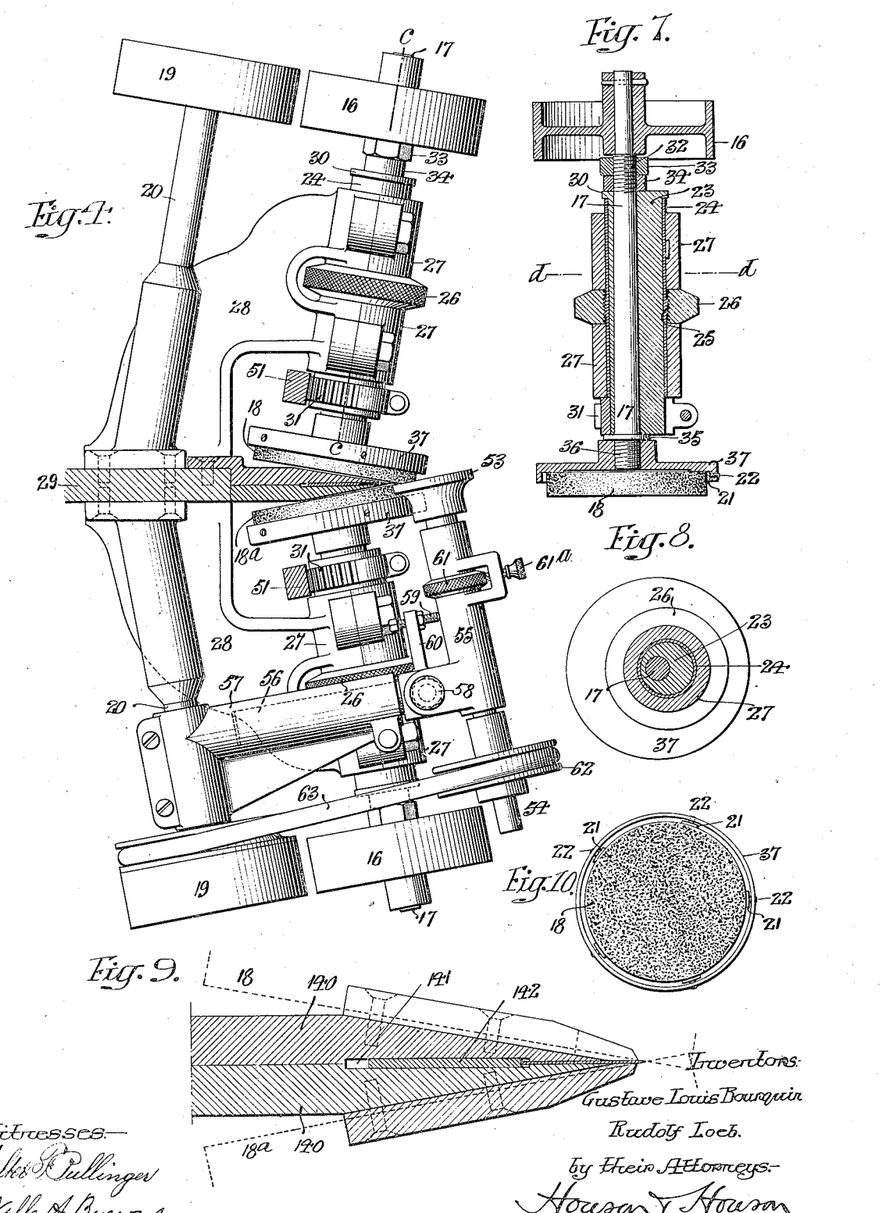
Fig. 7, is a sectional view of a portion of the apparatus shown in Fig. 4, taken on the line 7—7.
Fig. 8, is an elevation, partly in section on the line 8—8, Fig. 7.
Fig. 9, is an enlarged sectional view of a portion of the knife guides.
Fig. 10, is a face view of one of the grinding or polishing wheels showing the manner in which it is held in its carrier.
Figure 2:
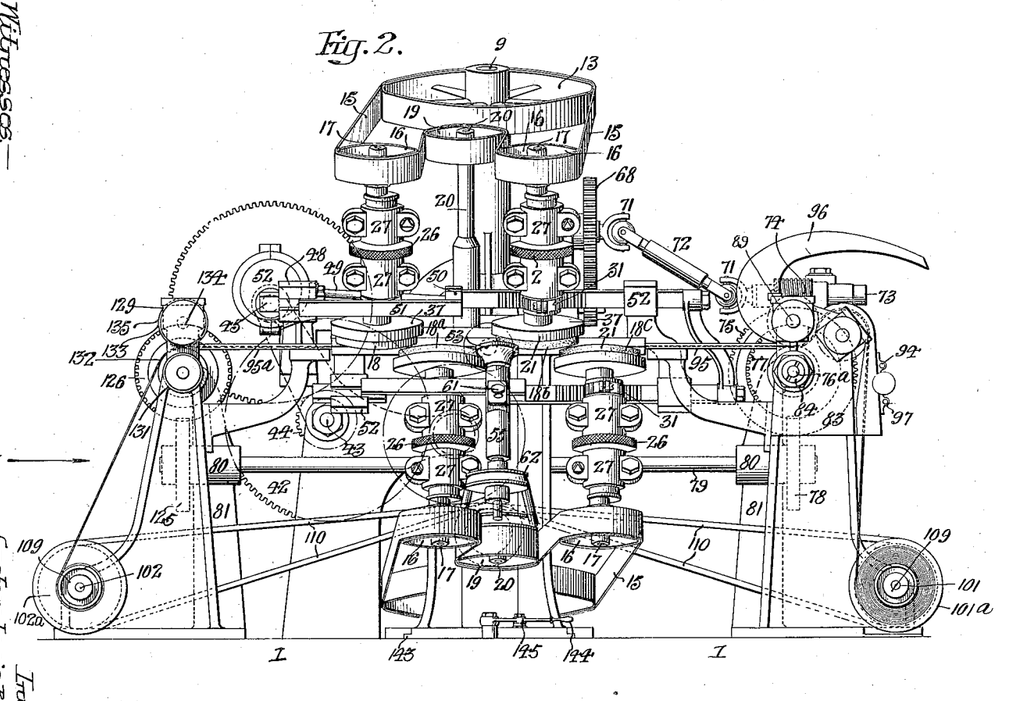
Fig. 2, is a front elevation of the same looking in the direction of the arrow $x$, Fig. 1.
Figure 3:
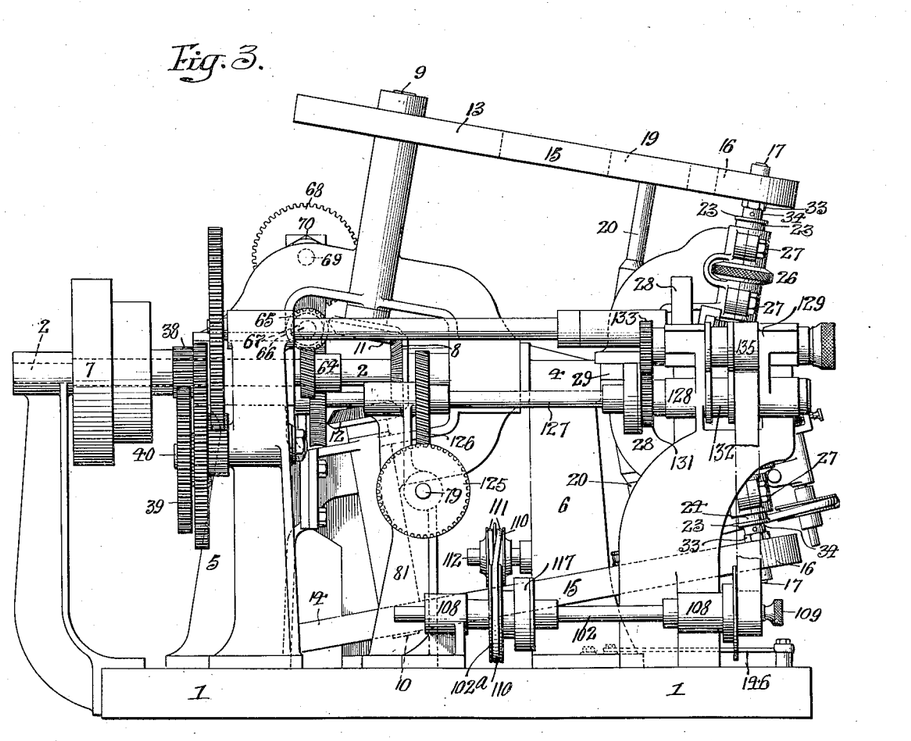
Fig. 3, is a side elevation looking in the direction of the arrow $y$, Fig. 1.
Figure 13:
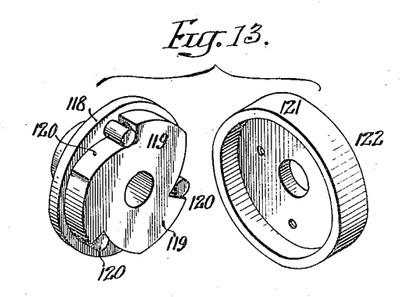
Fig. 13, is a perspective view of a clutch employed in connection with our improved apparatus.
Figure 14:
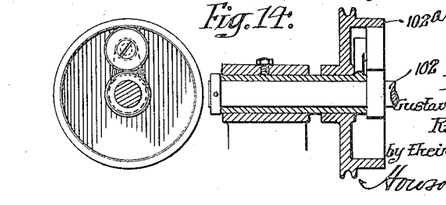
Fig. 14, is a view illustrating a detail of driving means for winding the band knife.

In commencing operations, a full spool carrying the strip or blank of sheet steel to form the finished structure may be placed on the end of the shaft 101, and a spool having the usual clutching means to engage the forward end of said band knife after the same has been sharpened may be placed on the end of the shaft 102. These shafts are suitably journaled in bearings 108 carried by the base or bed-plate of the machine, and the spools may be retained on the ends of the shafts by nuts 109, the shafts being threaded for the purpose. In drawing the band or strip of metal from the full spool, motion may be imparted to the shaft 101, and this motion may be transferred to the shaft 102 having the spool to receive the sharpened band knife by means of a belt 110; the shafts 101 and 102, having pulleys 101$^a$ and 102$^a$ for the same and said belt passing over guiding idlers 111 carried by a stud 112 suitably supported by the frame of the machine. The end of the steel band knife blank coming from the full spool may be directed into the guide 94, as shown in Fig. 6, over a roll 113 driven from the roll 90 and between the shearing means comprising the rolls 86 and 90, the former having flanges whereby it is cut to the proper width; the band then passing into the guide 95 and the cuttings into and through the guiding hood 96 which is supported on the extensions of the bracket 83. Curved guard pieces 114 and 115 are provided adjacent the roll 86 for the purpose of insuring the proper movement of the band knife; the guide 95 being of such width that the cuttings cannot gain admittance thereto. The guide 95 may be supported in place by an arm 116, carried by the bracket 83. The shaft 102 may be provided with a friction clutch 117, as shown in the perspective view, Fig. 13, for the purpose of allowing for any undue tension on the band-knife and insuring a uniform winding of the same. This clutch may be of the usual type, comprising a disk 118 with teeth 119 and loose balls or rollers 120 disposed in the space between said teeth and the flange 121 of the cup member 122. The shaft 79 carries at its end opposite the gear 78 another spiral gear wheel 125 meshing with a similar gear 126 on a shaft 127 journaled in a suitable bearing 128 carried by the bracket 81 and a bearing 129 carried by a bracket 116ª. The shaft 127 carries a pinion 131 and a roller 132, the pinion meshing with and driving a similar pinion 133 on a shaft 134 above the shaft 127 and carrying a roller 135 between which rollers the finished band knife may be drawn by the movement of the same so that it may be kept taut while being ground. The knife may be directed between these rolls by a guide 95ª carried by an arm 116ª mounted on a bracket 83ª. The shaft 127 carries a friction clutch 117ª similar to that mounted on the shaft 102 and is indicated at 117 in Fig. 13, and designed for the same general purpose. The band knife passing from between the rolls 86 and 90 enters the guide 95 and passes through the same, thence into and through guides 140 in which it may be supported while being ground as shown in Fig. 9. The guides 140 are recessed at 141 for the reception of a backing member 142, which is fixed to extensions of the bracket 83ª. The purpose of this backing member is to hold the band knife against the pressure brought to bear upon it by the grinding disks and prevent it from moving out of its proper position under the action of said disks. The recessed portion 141 may be wider than the backing member 142, to permit movement of said structure with the grinding disks away from the band knife. The supports for the driving wheels and grinding disks may be slidable in guiding grooves 143 in the bed plate of the machine and when it may be desired to move the grinding disks away from the knife, a lever 144 pivoted at 145 at the front of the machine may be drawn forward and by means of a connecting rod 146, the supports 5 and 6, which may be connected by bridge pieces 5ª and 6ª, move in said guides 143, and those parts which are attached to them may be given a slight forward movement while the knife remains in the normal position. In lieu of the clutch 117 on the shaft 102, we may provide the driving means shown in Fig. 14, comprising friction driven planetary gearing transmitting movement from the pulley 102ª to the shaft 102.

We claim:

1. In a sharpening machine, the combination of means for feeding a band of metal, grinding or sharpening disks mounted in the path of the same, and means for simultaneously oscillating and rotating said disks.

2. In a grinding or sharpening machine, the combination of means for shearing a band of metal, grinding or sharpening disks mounted in the path of one edge of said band of metal, means for maintaining said band of metal in positive alinement during the feed of the same, and means for simultaneously oscillating and rotating said disks.

3. In a grinding or sharpening machine, the combination of means for feeding a band of metal, means for trimming the same to uniform width, means for maintaining said band of metal in positive alinement during the feed of the same, grinding or sharpening disks mounted in the path of one edge of said band of metal, and means for simultaneously oscillating and rotating said disks.

4. In a grinding or sharpening machine, the combination of means for feeding a band of metal, means for trimming the same to uniform width, grinding and sharpening disks mounted in the path of one edge of the same, means for simultaneously oscillating and rotating said disks, and means for winding up the trimmed and sharpened band.

5. The combination, in a grinding machine for band knives, of means for feeding the band, means for trimming the same, a series of grinding disks for engagement with one edge of said band, means for driving said disks, and means for imparting an oscillating movement to said disks during their rotation.

6. The combination, in a knife sharpening machine, of means for feeding the band knife, sharpening disks for engagement with one edge of the same, means for rotating said disks, spindles carried thereby, pinions carried by said spindles, and means for actuating said pinions whereby an oscillating movement may be imparted to the grinding disks simultaneously with the rotation of the same.

7. The combination, in a knife sharpening machine, of means for feeding the band knife, sharpening disks for engagement with one edge of the same, means for rotating said disks, spindles carried thereby, pinions carried by said spindles, racks in engagement with said pinions, and means for operating said racks to actuate the pinions whereby an oscillating movement may be imparted to the grinding disks simultaneously with the rotation of the same.

8. The combination, in a grinding machine, of a delivery spool carrying band knife blade material, means for cutting or trimming said blade and simultaneously effecting the feed of the same, rotatable grinding disks for sharpening one edge of the blade disposed beyond the trimming point, means for simultaneously oscillating and rotating said disks, a receiving spool, and means for driving said receiving spool from the delivery spool.

9. The combination, in a grinding machine, of a spool carrying a band knife blade, means for driving said spool to effect the feed of the same, means for cutting or trimming said blade, means for maintaining said blade in true and predetermined alinement during the feed of the same, means for sharpening one edge of said blade, a receiving spool for the blade, and means for driving said receiving spool from the feed spool.

10. In a knife sharpening machine, the combination of means for feeding a band of metal, guiding means therefor, grinding or sharpening disks mounted in the path of said band of metal for engagement with the edge of the same, means for rotating said disks, means for imparting an oscillating movement thereto simultaneously with the rotative movement, and means for adjusting the disks with respect to the edge of the knife blade.

11. In a grinding or sharpening machine, the combination of means for feeding a band of blade metal, fixed guiding means therefor, a plurality of rotatable grinding disks disposed for engagement with one edge of said metal band, means for oscillating and simultaneously rotating said disks, and means for moving said grinding disks bodily away from said knife blade.

12. The combination of means for feeding a band of metal, guiding means for maintaining said band of metal in positive alinement during the feed of the same, means for shearing portions from the edge of said band and trimming the same to uniform width, a plurality of grinding disks disposed for engagement with one edge of said band, means for oscillating and simultaneously rotating said disks, and means for moving said disks bodily away from said knife.

13. The combination, in a grinding or sharpening machine, of means for feeding band knife blade material, means for maintaining said band of material in positive alinement during the feed of the same, means for trimming the same to uniform width, a series of grinding disks for engagement with one edge of said blade, means for oscillating and simultaneously rotating said disks, a receiving spool upon which the sharpened blade is wound, means for driving said spool from the feeding means and in direct relation to the speed of the latter, and means for maintaining the knife blade material taut between the feeding and receiving ends of the same.

14. The combination, in a knife sharpening machine, of means for feeding band knife blade material, a plurality of sharpening disks for engagement with one edge of the same, means for oscillating and simultaneously rotating said disks, and means for maintaining the edge of the blade in contact with said disks.

15. The combination, in a knife sharpening machine, of means for feeding band knife blade material, a plurality of sharpening disks for engagement with one edge of said material, means for oscillating and simultaneously rotating said disks, means for maintaining the blade in contact with the surface of said grinding disks, and means for keeping said blade taut during the sharpening operation.

16. The combination, in a knife sharpening machine, of a delivery spool, band knife blade material carried thereby, means for clamping the blade thereto, means for trimming said blade and simultaneously effecting feed of the same, a plurality of oscillating and rotating disks for sharpening one edge of the blade, a receiving spool, clamping means carried thereby for securing the end of the knife blade, and means for driving said receiving spool from the feed spool and in direct relation to the speed of the latter.

17. The combination, in a grinding machine, of a spool for carrying a knife blade blank, means for clamping the blade thereto, means for trimming said blade and effecting the feed of the same, means for sharpening one edge of the blade, a receiving spool also having clamping means, means for driving said receiving spool from the feed spool, and compensating means between the driving means and the receiving spool to regulate the delivery of the blade.

18. In a knife sharpening machine, the combination of means for feeding a band of blade metal, a plurality of grinding or sharpening disks mounted in the path of the same for engagement with one edge of said band of metal, means for oscillating and simultaneously rotating said grinding disks, a supplemental grinding element laterally disposed with respect to said grinding disks and rotatable in a different plane, and means for moving said grinding disks bodily away from the band of metal.

19. In a knife sharpening machine, the combination of means for feeding a band of knife blade material, means for trimming the same to uniform width, a plurality of grinding disks for engagement with one edge of the same, means for oscillating and simultaneously rotating said disks, and guiding means for supporting the blade in a relatively fixed position at the several grinding points.

20. In a sharpening machine, the combination of means for feeding a band of knife blade material, means for trimming the same to uniform width, a plurality of grinding disks mounted in the path thereof for engagement with one edge of said band of metal, means for maintaining said blade in true and predetermined alinement during its engagement by the driving means, means for oscillating and simultaneously rotating said grinding disks, means for supporting the blade in a relatively fixed position at the several grinding points, and means for simultaneously winding the sharpened blade passed beyond the grinding disks.

21. The combination, in a grinding machine for band knives, of means for feeding the knife blade blank, means for trimming the same, a series of grinding disks for engagement with one edge of said blade, means for rotating said disks, threaded sleeves carrying said disks, said sleeves being mounted in suitable bearings, and means for turning said sleeves to effect adjustment of the disks from and toward said knife blade.

22. The combination, in a knife sharpening machine, of means for feeding the band knife, sharpening disks for engagement with one edge of the same, means for rotating said disks, spindles carried thereby, pinions carried by said spindles, a frame having a series of racks in engagement with said pinions, a driving shaft, and means whereby an oscillating movement may be imparted to the grinding disks from said shaft simultaneously with the rotation of the same.

23. The combination, in a knife sharpening machine, of means for feeding the band knife, sharpening disks for engagement with one edge of the same, means for rotating said disks, spindles carried thereby, pinions carried by said spindles, a frame having a series of racks in engagement with said pinions, a driving shaft, an eccentric carried by said shaft, and a rod carried by said eccentric and connected to said rack frame whereby an oscillating movement may be imparted to the grinding disks simultaneously with the rotation of the same.

In testimony whereof, we have signed our names to this specification, in the presence of two subscribing witnesses.

GUSTAVE LOUIS BOURQUIN.
RUDOLF LOEB.

Witnesses:
   MURRAY C. BOYER,
   WM. A. BARR.